(12) United States Patent
Moser

(10) Patent No.: US 11,975,372 B2
(45) Date of Patent: May 7, 2024

(54) METHOD AND DEVICE FOR ASCERTAINING THE LATERAL STRIP CONTOUR OR THE POSITION OF THE STRIP EDGES OF A RUNNING METAL STRIP

(71) Applicant: Primetals Technologies Austria GmbH, Linz (AT)

(72) Inventor: Friedrich Moser, Hellmonsoedt (AT)

(73) Assignee: PRIMETALS TECHNOLOGIES AUSTRIA GMBH (AT)

(*) Notice: Subject to any disclaimer, the term of this patent is extended or adjusted under 35 U.S.C. 154(b) by 665 days.

(21) Appl. No.: 17/262,268

(22) PCT Filed: Jul. 9, 2019

(86) PCT No.: PCT/EP2019/068406
§ 371 (c)(1),
(2) Date: Jan. 22, 2021

(87) PCT Pub. No.: WO2020/020633
PCT Pub. Date: Jan. 30, 2020

(65) Prior Publication Data
US 2021/0260635 A1    Aug. 26, 2021

(30) Foreign Application Priority Data

Jul. 25, 2018  (EP) .................................. 18185390

(51) Int. Cl.
*B21B 1/22*  (2006.01)
*B21B 39/02*  (2006.01)
(Continued)

(52) U.S. Cl.
CPC ............... *B21B 39/02* (2013.01); *B21B 1/22* (2013.01); *G01B 5/0009* (2013.01); *G01B 5/20* (2013.01)

(58) Field of Classification Search
CPC ....... B21B 39/02; B21B 1/22; B21B 2263/30; B21B 38/04; B21B 37/68; B21B 38/00;
(Continued)

(56) References Cited

U.S. PATENT DOCUMENTS

| 4,570,472 A | 2/1986 | Kuwano | 73/8 |
| 4,718,262 A | 1/1988 | Fapiano | 72/6 |

(Continued)

FOREIGN PATENT DOCUMENTS

| CN | 1845803 A | 10/2006 |
| CN | 1863612 A | 11/2006 |

(Continued)

OTHER PUBLICATIONS

Chinese Office Action, dated Aug. 25, 2022, issued in corresponding Chinese Patent Application No. 201910625081.7. English Search Report.
(Continued)

*Primary Examiner* — Herbert K Roberts
*Assistant Examiner* — Anthony W Megna Fuentes
(74) *Attorney, Agent, or Firm* — OSTROLENK FABER LLP (57) ABSTRACT

A device for ascertaining the lateral strip contour and/or the position of the strip edges of a metal strip. It includes at least one sensing element for ascertaining suitable measurement data. The sensing element is integrated into a lateral guide together with a main part module of the metal strip conveying device. The lateral guide includes at least one wear element which is arranged in the lateral guide and which comprises a wear element adjusting device that can be rotated about a rotational axis substantially perpendicular to a guide plane of the lateral guide. The wear element together with the wear element adjusting device is designed as a sensing element. In an operating method, at least one
(Continued)

sensing element is brought into contact with a lateral edge at a starting time, and suitable measurement data is ascertained using the sensing element while the metal strip runs past the sensing element.

14 Claims, 5 Drawing Sheets

(51) Int. Cl.
  *G01B 5/00* (2006.01)
  *G01B 5/20* (2006.01)
  *B21B 37/22* (2006.01)
  *B21B 37/68* (2006.01)
  *B21B 38/00* (2006.01)
  *B21B 38/04* (2006.01)
  *B21B 39/14* (2006.01)

(58) Field of Classification Search
  CPC ..... B21B 39/14; B21B 2273/04; B21B 37/22; G01B 5/0009; G01B 5/20
  USPC .......................................................... 73/104
  See application file for complete search history.

(56) References Cited

U.S. PATENT DOCUMENTS

| | | | |
|---|---|---|---|
| 4,974,333 A | 12/1990 | Ginzburg | 33/783 |
| 6,983,631 B2 | 1/2006 | Seidel | 72/7.6 |
| 7,434,435 B2 | 10/2008 | Richter et al. | 72/236 |
| 7,849,722 B2 | 12/2010 | Britanik et al. | 72/9.2 |
| 8,217,377 B2 | 7/2012 | Jepsen et al. | 250/559.24 |
| 8,429,943 B2 | 4/2013 | Jepsen et al. | 72/10.4 |
| 8,616,034 B2 | 12/2013 | Tuschhoff | |
| 8,616,035 B2 | 12/2013 | Tuschhoff | 72/14.4 |
| 8,919,162 B2 | 12/2014 | Moretto et al. | 72/8.3 |
| 9,616,474 B2 | 4/2017 | Schilling et al. | |
| 10,376,938 B2 | 8/2019 | Frauenhuber et al. | |
| 2007/0006625 A1 | 1/2007 | Reinschke | 72/11.7 |
| 2009/0116041 A1* | 5/2009 | Jepsen | B21B 37/22 164/151.2 |
| 2010/0161104 A1 | 6/2010 | Lofgren et al. | 700/109 |
| 2012/0324971 A1 | 12/2012 | Simaan et al. | 72/7.4 |
| 2013/0186156 A1 | 7/2013 | Richter et al. | |
| 2016/0214154 A1 | 7/2016 | Frauenhuber et al. | |
| 2021/0260635 A1 | 8/2021 | Moser | |

FOREIGN PATENT DOCUMENTS

| | | |
|---|---|---|
| CN | 101175582 A | 5/2008 |
| CN | 101443135 A | 5/2009 |
| CN | 101605617 A | 12/2009 |
| CN | 102202806 A | 9/2011 |
| CN | 102223959 A | 10/2011 |
| CN | 102470412 A | 5/2012 |
| CN | 101454090 B | 9/2012 |
| CN | 102665949 A | 9/2012 |
| CN | 102770220 A | 11/2012 |
| CN | 204807219 U | 11/2015 |
| CN | 105188973 A | 12/2015 |
| CN | 105705260 A | 6/2016 |
| CN | 108136468 A | 6/2018 |
| CN | 211218041 U | 8/2020 |
| DE | 3116278 A1 | 11/1982 |
| DE | 10157792 A1 | 6/2003 |
| DE | 10 2004 043 790 A1 | 3/2006 |
| DE | 10 2006 024 761 A1 | 11/2007 |
| DE | 102007038758 A1 | 5/2008 |
| DE | 102009035747 A1 | 3/2010 |
| DE | 102014215397 A1 | 2/2016 |
| EP | 0974406 A2 | 1/2000 |
| EP | 2823901 A1 | 1/2015 |
| GB | 2100475 A | 12/1982 |
| GB | 2138180 A | 10/1984 |
| JP | S59-189011 A | 10/1984 |
| JP | 2005-074427 A | 3/2005 |
| JP | 2009-539074 A | 11/2009 |
| KR | 10-2004-0055979 A | 6/2004 |
| RU | 2399447 C2 | 9/2010 |
| SU | 1295200 A1 | 3/1987 |
| TW | M595547 U | 5/2020 |
| WO | WO 02/078872 A1 | 10/2002 |
| WO | WO 2011/076607 A2 | 6/2011 |
| WO | WO 2015/043926 A1 | 4/2015 |
| WO | WO 2018/095717 A1 | 5/2018 |

OTHER PUBLICATIONS

Notification to Grant a Patent Right dated Aug. 25, 2023 issued in corresponding Chinese Patent Application No. 201910625081.7. English translation attached.
Office Action dated Oct. 17, 2023, issued in corresponding Taiwanese Patent Application No. 108124223.
Japanese Notice of Allowance, dated Apr. 18, 2022, issued in corresponding Japanese Patent Application No. 2021-503766. Total 3 pages.
International Search Report dated Sep. 18, 2019 in corresponding PCT International Application No. PCT/EP2019/068406.
Written Opinion dated Sep. 18, 2019 in corresponding PCT International Application No. PCT/EP2019/068406.
European Search Report dated Jan. 15, 2019 in corresponding European Patent Application No. 18185390.4.
Russian Federation Office Action, dated Nov. 17, 2021, issued in corresponding Russian Patent Application No. 2021101261/05(002455). English translation. Total 21 pages.
Office Action dated May 24, 2023, issued in corresponding Chinese Patent Applicaton No. 201910625081.7. English translation of Search Report.

* cited by examiner

METHOD AND DEVICE FOR ASCERTAINING THE LATERAL STRIP CONTOUR OR THE POSITION OF THE STRIP EDGES OF A RUNNING METAL STRIP

CROSS-REFERENCE TO RELATED APPLICATIONS

The present application is a 35 U.S.C. §§ 371 national phase conversion of PCT/EP2019/068406, filed Jul. 9, 2019, the contents of which are incorporated herein by reference, which claims priority of European Patent Application No. 18185390.4 filed Jul. 25, 2018, the contents of which are incorporated by reference herein. The PCT International Application was published in the German language.

FIELD OF THE INVENTION

The invention relates to a method and to a device for determining the lateral strip contour and/or the position of the strip edges of a metal strip running over a metal strip conveyor device of a rolling mill, and to a method for correcting the running of the strip.

PRIOR ART

When rolling metal strips in a rolling mill, the thickness of the metal strips running through roll stands is gradually reduced, wherein the reduction in thickness also leads to variation in the width. The orientation of the lateral edges, also referred to as the lateral strip contour in the context of this application, and relative to the longitudinal axis of the metal strip can differ over the length of the metal strip. This can lead, for example, to the so-called formation of sabers, wherein one lateral edge wanders in the direction of the longitudinal axis while the other lateral edge wanders in the direction away from the longitudinal axis. A largely parallel alignment of the lateral edges in relation to the longitudinal axis is preferred. Attempts are made to identify deviations from this desired ideal state at an early stage so as to be able to initiate countermeasures. For example, the lateral strip contour is monitored by cameras, and any unfavorable development is optionally counteracted by varying the position of the rollers in the roll stands. However, the equipment with cameras necessary to this end requires space, increases the complexity of the rolling mill, is expensive and maintenance-intensive, and is prone to errors under the environmental conditions which are unfavorable for optical detection.

DE102004043790A1 discloses a formation of sabers to be identified with special devices by measuring the position and/or the compressive force of an edge of the metal strip and for a variation of the rolling gap geometry to be correspondingly initiated.

SUMMARY OF THE INVENTION

Technical Object

A device and a method for operating the device permit the lateral strip contour and/or the position of the strip edges of a metal strip running in a rolling mill to be determined in a manner which is simpler in terms of construction.

Technical Solution

This object is achieved by a device for determining the lateral strip contour and/or the position of the strip edges of at least one portion of a metal strip (1) running over a metal strip conveyor device of a rolling mill, and preferably a hot-rolling mill.

The device has at least one sensing element (3) which is suitable to be brought into contact with a lateral edge of the running metal strip for gathering measuring data suitable for determining the lateral strip contour and/or the position of the strip edges. The at least one sensing element (3) is integrated in a lateral guide (17) of the metal strip conveyor device. The lateral guide (17) comprises at least one wear member (8) having a wear member adjustment device. The wear member (8) is disposed in a main member module of the lateral guide and is rotatable about a rotation axis that is substantially perpendicular to a guide plane of the lateral guide, wherein the wear member (8) having the wear member adjustment device (9) is embodied as a sensing element.

The metal strip in the rolling mill runs over a metal strip conveyor device, for example a roller table.

The lateral strip contour and/or the position of at least the strip edges can be determined, for example, ahead of a roll stand, after a roll stand, or between different roll stands.

The lateral strip contour and/or the position of the strip edges of the entire metal strip, or of a portion of the metal strip, can be determined.

Lateral guides guide the metal strip by contact with the lateral edges of said metal strip.

According to the invention, the at least one sensing element is integrated in a lateral guide of the metal strip conveyor device. At least one sensing element can also be in each case integrated in a plurality of lateral guides, for example lateral guides on both sides of the metal strip. A plurality of sensing elements can also be present in one or a plurality of lateral guides. At least two sensing elements are preferably installed in such a manner that at least one sensing element for gathering measuring data suitable for determining the lateral strip contour and/or the position of at least the strip edges is able to be used on each longitudinal side of the metal strip. A sensing element is suitable for gathering measuring data suitable for determining the lateral strip contour and/or the position of the strip edges and can be brought into contact with the lateral edge of a running metal strip.

According to the invention, the lateral guide comprises at least one wear member having a wear member adjustment device. The wear member is disposed in a main member module of the lateral guide. The wear member having the wear member adjustment device is embodied as a sensing element.

As is set forth in WO2015043926A1, its disclosure is comprised by the present application, and the lateral guide has a guide plane, for example the guide plane of the main member module of the lateral guide. The wear members are rotatable about a rotation axis which is substantially perpendicular to the guide plane of the lateral guide, for example, which is the guide plane of the main member module of the lateral guide, for example. The guide plane of the lateral guide, which is the guide plane of the main member module of the lateral guide, for example, is preferably substantially vertical, and during the operation, preferably also substantially perpendicular to the strip surface of the running metal strip. As a consequence of the rotatability, the wear members can assume different rotary positions. The rotation can take place to specific discrete positions which are maintained over a comparatively long time, for example rotated by 8°, or by an integer multiple of 8°, in relation to a starting position and remaining until progressive wear necessitates a new position. The rotation can also take place continuously. The wear members preferably have a wear face which is substantially planar and in all rotary positions is substantially parallel to the guide plane. The wording "substantially" comprises minor deviations from the perpendicular or vertical or parallel or planar, respectively, which are caused by production tolerances, for example; for example deviations of up to +/−5°.

The wear members can be configured so as to be disk-shaped, for example.

The wear member adjustment device can comprise a rotary drive for varying the rotary position of the wear members in terms of a rotation about the rotation axis. The wear member adjustment device can also comprise a thrust drive for displacing the wear member in the direction of the rotation axis. The wear member adjustment device can also comprise a rotary drive for varying the rotary position of the wear members, by rotation about the rotation axis, and a thrust drive for displacing the wear member in the direction of the rotation axis.

Advantageous Effects of the Invention

The construction mode according to the invention enables the strip contour determination, or the edge position determination, respectively, to be embodied in a space-saving manner, and enables elements of the lateral guide already present for another purpose to be utilized in an economically advantageous manner as a sensing element.

According to the invention, at least one wear member having a wear member adjustment device is embodied as a sensing element. Contacting the lateral edge of the metal strip takes place by the wear face of the wear member. This in any case takes place for fulfilling the guide function of the lateral guide by the wear member. The wear member adjustment device is suitable for measuring a path in relation to a reference and/or for measuring a force exerted on the wear member, for example. A wear member having a wear member adjustment device can act as a sensing element also while the guiding function in the lateral guide is exercised.

When the wear members are rotatable about a rotation axis which is substantially perpendicular to the guide plane, and particularly when the wear members also have a wear face which is substantially planar and in all rotary positions is parallel to the guide plane of the main member module, it is possible for the guiding function as well as the function as a sensing element to be exercised over a long time without any replacement being required. On account of the wear members being able to be rotated to different rotary positions, wear as a result of the guiding action can be distributed, which increases the service life of the wear members. In plants as known from DE102006024761A1, the guide ruler of the lateral guide in comparison wears out significantly faster, for example. If the sensing element were to be utilized as a guide element, the sensing element like the guide ruler would have to be replaced frequently and with complexity. In order to circumvent this set of issues in such plants, the sensing element therein is not simultaneously utilized as a guide element and therefore is exposed to less wear. A construction mode with an increased service life as described above permits wear members to be utilized also as sensing elements, without causing a high requirement for refurbishing the sensing elements on account thereof. The construction and the maintenance is less complex because no sensing elements that are separate from wear members are required.

It is advantageous for a plurality of sensing elements to be present. As a result, the metal strip can be better measured because measuring data can be simultaneously gathered at a plurality of locations of the metal strip.

An apparatus for establishing contact by a preselected starting contact force at the starting time is preferably present. This can take place mechanically or hydraulically, for example, using a spring element or using a hydraulic system or a hydraulic cylinder, respectively, for example.

The at least one sensing element is preferably suitable for measuring a path in relation to a reference and is preferably suitable for measuring a force exerted on the sensing element.

The device according to the invention having wear members for determining the lateral strip contour and/or the position of the strip edges can in principle be embodied as is shown, for example, in WO2015043926A1, the content thereof being comprised by the present application.

At least one sensing element will preferably be brought into contact on each of the two lateral edges of the metal strip. A plurality of sensing elements can also be present on each of the lateral edges.

An apparatus for maintaining the position assumed by the sensing element at the starting time, is preferably present as long as the force exerted by the metal strip on the sensing element remains above 0 and below a limit value.

According to one preferred embodiment, the device for determining the lateral strip contour and/or the position of the strip edges is also suitable for transmitting gathered measuring data and/or the lateral strip contour and/or the position of the strip edges to open-loop and/or closed-loop control installations for roll stands and/or for lateral guides of the rolling mill.

A further subject matter of the invention relates to a method for operating a device according to the invention. This is a method for determining the lateral strip contour and/or the position of the strip edges of at least one portion of a metal strip running over a metal strip conveyor device of a rolling mill, preferably a hot-rolling mill. At a starting time, at least one sensing element is brought into contact with a lateral edge of the metal strip, and suitable measuring data for determining the lateral strip contour and/or the position of the strip edges is gathered by the sensing element while the portion of the metal strip runs past the sensing element.

According to the invention, contact between a sensing element and a lateral edge of the metal strip is utilized for determining the strip contour, or the position of the strip edges in relation to a reference, respectively. On account of the direct contact and the measurement directly on the metal strip, this can take place in a manner that is more precise and less prone to errors in terms of the environmental conditions than in methods using an observation by cameras.

At least one or a plurality of sensing elements can be brought into contact on each of the two lateral edges of the metal strip. A plurality of sensing elements can also be present on each of the lateral edges. Contacting at the starting time applies a preselected starting contact force at which the sensing element is pressed onto the lateral edge, preferably in an ideally gentle manner, while avoiding any damage to the lateral edge.

A sensing element is brought into contact with a lateral edge of the running metal strip at a starting time. Starting time here refers to the commencement of the method for determining the lateral strip contour. The method starts by establishing contact between the sensing element and the lateral edge. Measuring data suitable for determining the lateral strip contour and/or the position of the strip edges is gathered by the sensing element while the metal strip, or the portion of the metal strip to be measured, respectively, runs past the sensing element. The measuring data can be, for example, measuring data pertaining to a path or a spacing, respectively, or pertaining to a force. For example, when a hydraulic system or a hydraulic cylinder, respectively, is utilized for establishing the contact, also referred to as actuating, the measuring data can also pertain to the variable pressure in the hydraulic system or the hydraulic cylinder, respectively, during the running of the metal strip. The measuring data can be measured while maintaining contact or relating to the contact potentially being interrupted.

The lateral strip contour and/or the position of the strip edges is consequently determined based on gathered measuring data. According to one preferred variant, the measuring data relates to the spacing of the sensing element from a reference when contacting the lateral edge of the metal strip. For example, variations of the spacing, thus paths, or the size of the spacing can be measured. For example, the spacing of the sensing element from a reference, the latter in principle being able to be arbitrarily established by the operator, is established at a point in time in which there is contact between the sensing element and the lateral edge of the metal strip. The spacing here can also be 0 if the reference is correspondingly selected. The reference can be, for example, a reference point in the rolling mill, for example, or a reference position of a sensing element which can assume a plurality of positions. The spacing of the sensing element from a reference is easy to measure.

According to one preferred variant, the measuring data relates to the force exerted by the metal strip on the sensing element. Variations of the force or the size of the force can be measured, for example. The force can also be 0, for example when contact between the lateral edge of the metal strip and the sensing element is lost by virtue of the formation of sabers. The force exerted by the metal strip on the sensing element is easy to measure.

According to one preferred variant, after the starting time, while the portion of the metal strip runs past the sensing element, measuring data of the force exerted by the metal strip on the sensing element is gathered, wherein the position of the sensing element assumed at the starting time is maintained as long as the force exerted by the metal strip on the sensing element remains above 0 and below a limit value. The limit value can be selected by the operator of the method. When the limit value is exceeded, the position is varied such that the force decreases; damage to the lateral edge is thereby avoided in this way, whether or not the portion has a saber. Since the position of the sensing element does not vary in comparison to the starting time, a formation of sabers can lead to an increase in the force because the metal strip, by virtue of the convexity, presses more intensely against the sensing element.

Measuring data of the force exerted by the metal strip on the sensing element is gathered. The position assumed by the sensing element at the starting time is maintained as long as the force exerted by the metal strip on the sensing element remains above 0 and below a limit value. Maintaining the position assumed by the sensing element at the starting time can take place like this, for example. For establishing contact at the starting time, the sensing element is actuated by a hydraulic cylinder against the metal strip by a starting contact force, and the hydraulic cylinder in this position is then locked in terms of the flow of hydraulic fluid between the chambers of the cylinder. A valve which is correspondingly set can be provided so as to avoid a limit value of the force exerted by the metal strip on the hydraulic cylinder being exceeded.

When a formation of a saber leads to a loss of contact, the force reverts to 0. It can arise in this instance that the sensing element varies its position somewhat by virtue of the absence of resistance.

According to one preferred variant, contact at the starting time is established by way of a preselected starting contact force. Contact between the lateral edge and the sensing element after the starting time is maintained at the starting contact force while the portion of the metal strip runs past the sensing element. Measuring data is gathered from variations in the spacing from the reference necessary to this end. In this way, it can be simply established whether the portion has a saber. When a saber is present, the sensing element for maintaining contact has to leave its position assumed at the starting time so as to maintain the starting contact force.

The lateral strip contour and/or the position of the strip edges of the metal strip, or of the metal strip portion on which measuring has taken place, respectively, is determined based on the measuring data discussed above. For example, the lateral strip contour can be calculated from the measuring data in a simple manner while including the strip speed and the point of time of determining the measuring data. For example, the necessary variations of the position of the sensing element for maintaining contact at the starting contact force conjointly with the corresponding items of information relating to the point in time indicate at which locations of the longitudinal extent of the measured metal strip concavities or convexities of sabers are present. The strip contour and/or the position of the strip edges can thus be determined.

By determining the position of the strip edge in relation to a reference, it can be identified whether there are deviations from a desired strip run. For example, it can be identified when a metal strip, which has the desired width without any sabers, runs into a roll stand or out of a roll stand askew in relation to the desired strip running direction.

Like the formation of sabers, this is somewhat undesirable and can be simply identified and consequently optionally corrected according to the invention by determining the position of the strip edges.

A further subject matter of the application relates to a method for correcting the running of a metal strip over a metal strip conveyor device of a rolling mill, preferably a hot-rolling mill, by means of a device according to the invention. Based on the measuring data gathered according to a method according to the invention and/or based on the determined lateral strip contour and/or the position of the strip edges, corrective measures are performed on one or a plurality of roll stands and/or on one or a plurality of lateral guides of the rolling mill.

Closed-loop controlling of the corrective measures on roll stands and/or on lateral guides which is performed based on the measuring data gathered according to the invention and/or the lateral strip contour determined according to the invention and/or the position of the strip edges is preferred.

A rolling mill comprises inter alia roll stands, metal strip conveyor devices, and lateral guides for the metal strip. Based on the gathered measuring data and/or the lateral strip contour and/or the position of the strip edges determined according to a method according to the invention it can be established which potentially undesirable strip contours or strip runs, respectively, currently arise. Corrective measures, such as an adjustment of rollers in the roll stand or a displacement of the position of lateral guides, may correspondingly optionally be performed.

For example, the spacing of the sensing element from an active element, for example the next active element in the running direction, by way of which the lateral strip contour can be influenced is known, for example the spacing from the rolling gap of the next roll stand. In the case of a known strip speed, it can in this instance be calculated at which point in time a corrective measure is to take place in the active element, and what kind of corrective measure is to take place, in order for the established deviation from a desired lateral strip contour, or a desired strip run, respectively, to be corrected.

In conventional rolling mill plants, the production line is composed of five to seven roll stands which are disposed at spacings between 5 to 7 meters. A strip entry ruler as a lateral guide is situated ahead of each roll stand. These strip entry rulers have the task of introducing the lead of the strip in a centric manner into the roll stand, or the rolling gap of the latter, respectively. When sensing elements are integrated in the lateral guides, for example in the various strip entry rulers, according to one embodiment according to the invention, the strip contour can be measured by way of a plurality of measuring points across the extending strip length. After a first sensing element, the corrective measures taken by the roll stand following the sensing element can also be checked using a further sensing element directly after this roll stand. Consequently, additional correction by means of the values measured by the further sensing element can optionally again take place in a following roll stand by way of an additional corrective step. The number of possible corrective steps is, for example, a function of the number of roll stands and the number of sensing elements, or the number of lateral guides equipped with sensing elements, or strip entry rulers, respectively.

In principle, corrective measures can also be performed in that the position of lateral guides is adjusted. For example, lateral guides in the rolling mill can in principle be embodied as shown in WO2015043926A1, the content thereof being incorporated by reference in the present application.

A further subject matter of the present application relates to a signal processing installation having a machine-readable program code, wherein the said program code has closed-loop control commands for carrying out a method according to the invention.

A further subject matter of the present application relates to a machine-readable program code for a signal processing installation, characterized in that the program code has closed-loop control commands which prompt the signal processing installation to carry out a method according to the invention.

A further subject matter of the present application relates to a non-transitory storage medium having a machine-readable program code according to the invention stored thereon.

BRIEF DESCRIPTION OF THE DRAWINGS

The invention will be explained by means of schematic exemplary illustrations of embodiments.

DESCRIPTION OF THE EMBODIMENTS

Examples

Figure 1A:
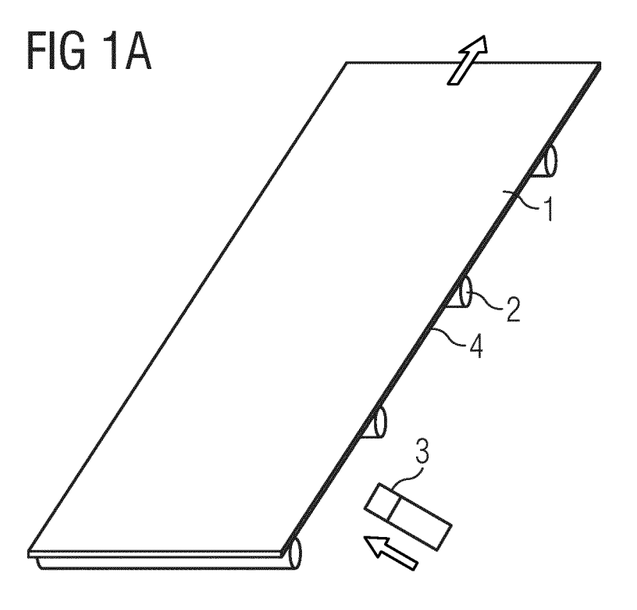
FIGS. 1a, 1b, 1c schematically show how a method for determining the lateral strip contour of a portion of a metal strip running over a metal strip conveyor device of a rolling mill is used in a device according to the invention.
Figure 1B:
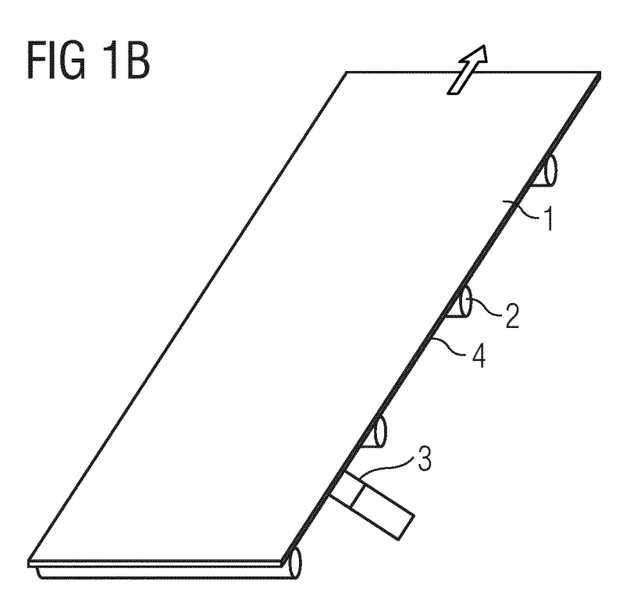
Figure 1C:
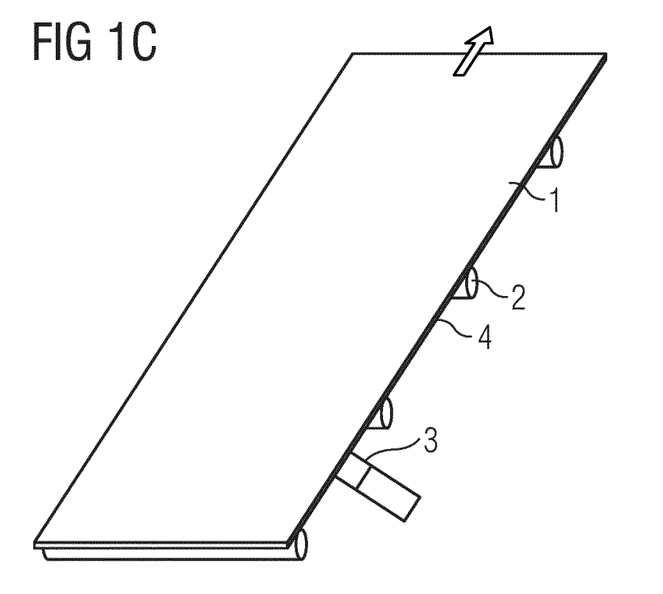

FIGS. 1a, 1b, 1c schematically show how a method according to the invention for determining the lateral strip contour of a portion of a metal strip running over a metal strip conveyor device of a rolling mill is used.

It is illustrated in FIG. 1a how a metal strip 1 runs over a metal strip conveyor device, here a roller table having roller table rollers 2. The running direction is indicated by an arrow. A sensing element 3 is present but does not contact the lateral edge 4 of the metal strip 1. It is indicated by a block arrow that the sensing element is moved in the direction of the lateral edge 4.

The starting time of the method according to the invention is illustrated in FIG. 1b. Contact between the sensing element 3 and the lateral edge 4 has been established. Gathering of measuring data suitable for determining the lateral strip contour and/or the position of the strip edges is commenced, while the portion of the metal strip runs past the sensing element and contact is maintained, this being illustrated in FIG. 1c. The lateral strip contour and/or the position of the strip edges is consequently determined based on measuring data gathered.

Figure 2A:
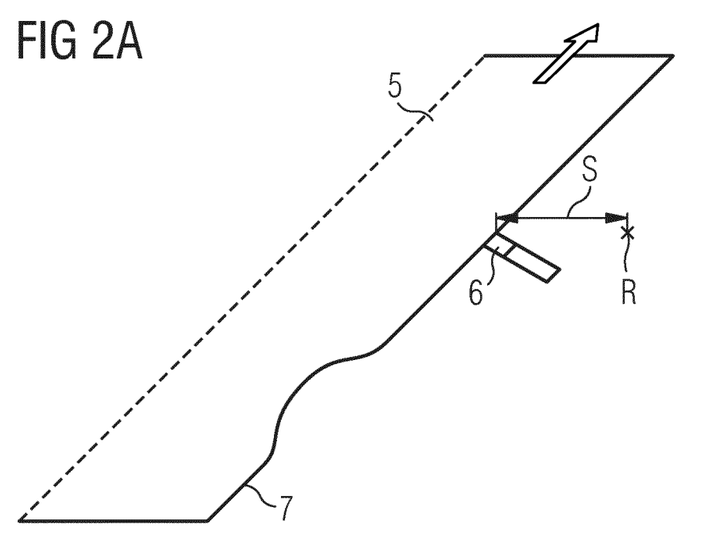
FIGS. 2a, 2b, 2c schematically show how measuring data pertaining to a saber is gathered while maintaining contact between the lateral edge and the sensing element.
Figure 2B:
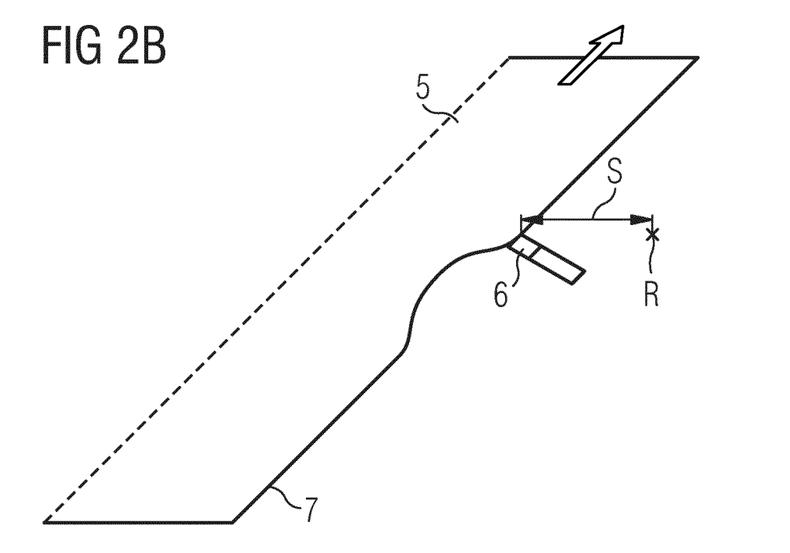
Figure 2C:
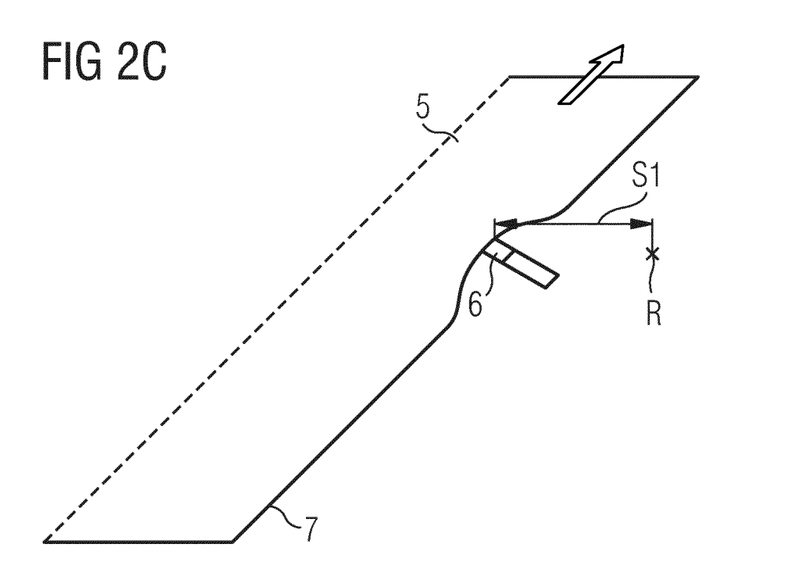

FIGS. 2a, 2b, 2c schematically show how a metal strip 5 with a saber runs past a sensing element 6 which is in contact with the lateral edge 7. The running direction is indicated by an arrow. Only one lateral edge 7 of the metal strip 5 is illustrated, the metal strip 5 not being shown in the entire width thereof.

The spacing S of the sensing element 6 from a reference R is illustrated in FIG. 2a. A concavity of a saber in the metal strip 7 approaches the sensing element 6. The concavity reaches the sensing element 6 in FIG. 2b. Contact between the sensing element 6 and the lateral edge 7 is maintained while the metal strip is running. In order to maintain contact in the concavity, the sensing element is moved into the concavity as is illustrated in FIG. 2c. The spacing S1 from the reference R is correspondingly larger than the spacing S. In the case of a saber-related convexity of the lateral edge, the spacing would likewise vary when the sensing element is moved so as to follow the lateral contour while maintaining contact with the latter.

Figure 3:
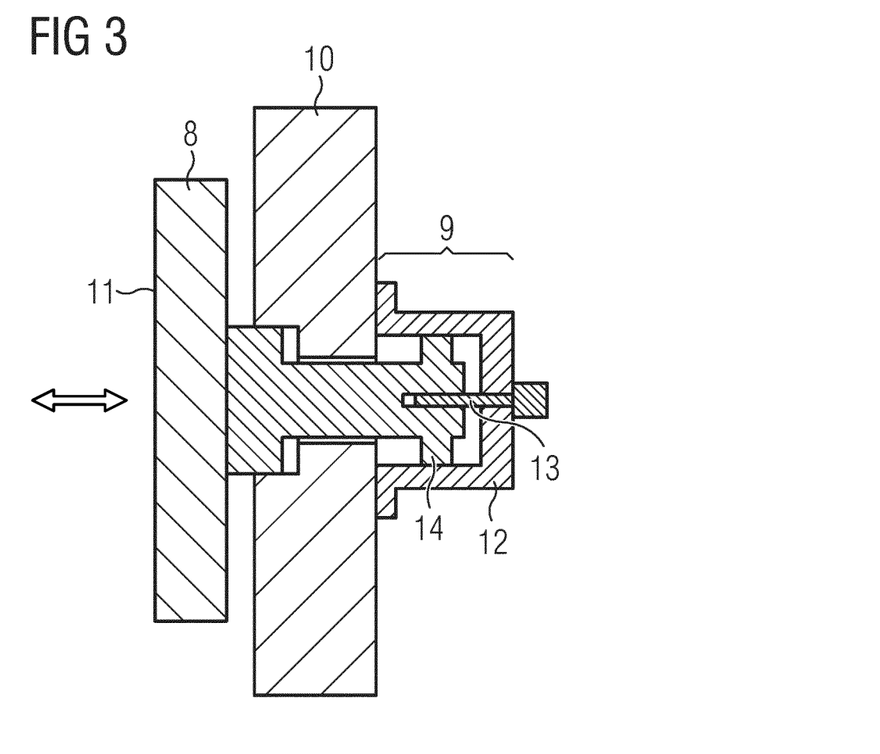
FIG. 3 schematically shows an embodiment of a sensing element.

FIG. 3 schematically shows a wear member 8 having a wear member adjustment device 9, wherein the wear member 8 having the wear member adjustment device 9 is embodied as a sensing element and can be disposed in a main member module 10 of a lateral guide of a rolling mill. Contacting a lateral edge of a metal strip is by the wear face 11 of the wear member 8. The position of the wear member 8 can be adjusted by the wear member adjustment device 9, as indicated by a double arrow. The wear member adjustment device 9 comprises a hydraulic cylinder in which a path sensor 13 is present. That sensor can gather, for example, measuring data pertaining to variations of the position of the cylinder ram 14 and thus of the wear member 8 is present. The wear member 8 or the wear member adjustment device 9 can also be suitable for measuring a force exerted on the wear member 8. This is not specifically illustrated for improved clarity. The measuring data can be gathered while the wear member in the lateral guide fulfils its guiding task by contacting the lateral edge of the metal strip. The illustration of a rotary drive which is optionally likewise present has been dispensed with for improved clarity.

Figure 4:
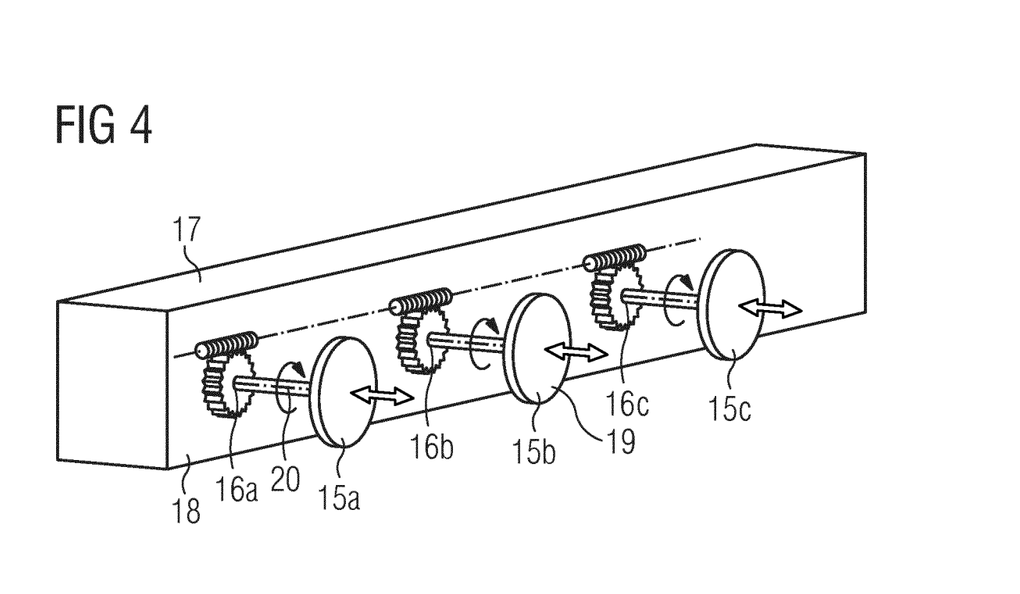
FIG. 4 schematically shows an integration of sensing elements in a lateral guide.

FIG. 4 schematically shows how wear members 15a, 15b, 15c which have wear member adjustment devices 16a, 16b, 16c are integrated as a sensing element in a lateral guide 17. Illustrated is a main member module of the lateral guide 17. The guide plane 18 of the lateral guide is the guide plane of the main member module. The wear members have wear faces 19 which are substantially planar and in all rotary positions are substantially parallel to the guide plane 18. The wear faces 19 are rotatable about the rotation axes 20, indicated by a circular arrow. The rotation axes 20 are substantially perpendicular to the guide plane 18. The wear member adjustment devices 16a, 16b, 16c in the example illustrated comprise a rotary drive for varying the rotary position of the wear members in terms of a rotation about the rotation axis, and a thrust drive for displacing the wear member in the direction of the rotation axes. This is illustrated by double arrows.

Figure 5:
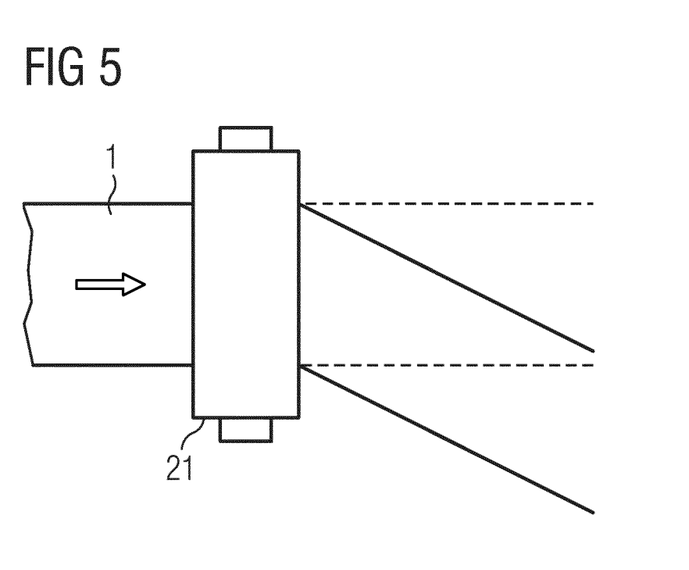
FIG. 5 schematically shows a deviation from a desired strip run.

FIG. 5 schematically shows how a metal strip 1 in the running direction of the arrow runs into a roll stand 21. When viewed in the running direction, the strip behind the roll stand 21 deviates from the desired strip run; the desired strip run is drawn so as to be bordered by dashed lines, while the actual strip run undesirably deviating therefrom is illustrated with solid borders.

The description given hitherto of advantageous embodiments of the invention contains numerous features which are in some cases reproduced together in groups in the individual dependent claims. However, these features can expediently also be considered individually and combined into other meaningful combinations. In particular, these features can be combined individually and in any suitable combination in a method according to the invention.

Even if some terms are in each case used in the singular or in combination with a quantifier in the description and/or in the patent claims, there is no intention to restrict the scope of the invention to the singular or the respective quantifier in respect of these terms. Moreover, the words "a" and "an" should not be interpreted as quantifiers but as indefinite articles. The described properties, features and advantages of the invention and the manner in which these are achieved will become more clearly and distinctly comprehensible in conjunction with the description of the illustrative embodiment/s of the invention, which is/are explained in greater detail in conjunction with the drawings. The illustrative embodiment/s serve/s to explain the invention and does/do not restrict the invention to combinations of features, including functional features, indicated therein. In addition, suitable features of any illustrative embodiment can furthermore also be explicitly considered in isolation, removed from an illustrative embodiment, introduced into some other illustrative embodiment to supplement the latter, and combined with any of the claims.

While the invention has been illustrated and described in detail by the preferred illustrative embodiment/s, the invention is not limited by the disclosed example/s and other variations may be derived therefrom without departing from the scope of protection of the invention according to the claims.

LIST OF REFERENCE SIGNS

1 Metal strip
2 Roller table rollers
3 Sensing element
4 Lateral edge
5 Metal strip
6 Sensing element
7 Lateral edge
8 Wear member
9 Wear member adjustment device
10 Main member module
11 Wear face
12 Hydraulic cylinder
13 Path sensor
14 Cylinder ram
15a, 15b, 15c Wear member
16a, 16b, 16c Wear member adjustment device
17 Lateral guide
18 Wear face
19 Guide plane
20 Rotation axis
21 Roll stand

LIST OF CITATIONS

Patent Literature

WO2015043926A1

The invention claimed is:

1. A device for determining a lateral strip contour and/or a position of strip edges of at least one portion of a metal strip which runs over a metal strip conveyor device of a rolling mill; the device comprising:
    at least one sensing element configured for gathering measuring data suitable for determining the lateral strip contour and/or the position of the strip edges that is to be brought into contact with a lateral edge of the running metal strip;
    a lateral guide of the metal strip conveyor device;
    the at least one sensing element is integrated in the lateral guide of the metal strip conveyor device, the lateral guide comprises at least one wear member having a wear member adjustment device, the at least one wear member being disposed in a main member module of the lateral guide and the at least one wear member being rotatable about a rotation axis that is substantially perpendicular to a guide plane of the lateral guide; and
    wherein the at least one wear member and the wear member adjustment device are embodied as the at least one sensing element.

2. The device as claimed in claim 1, wherein the at least one wear member has a wear face which is substantially planar and in all rotary positions is substantially parallel to the guide plane.

3. The device as claimed in claim 1 further comprising an apparatus configured to establish contact by a preselected starting contact force at a starting time.

4. The device as claimed in claim 1, further comprising the at least one sensing element is suitable for measuring a path in relation to a reference.

5. The device as claimed in claim 1, further comprising the at least one sensing element is configured and operable for measuring a force exerted on the sensing element.

6. The device as claimed in claim 1, further comprising an apparatus configured to maintain a position assumed by the sensing element at a starting time, as long as a force exerted by the metal strip on the sensing element remains above 0 and below a limit value.

7. A method for determining the lateral strip contour and/or the position of the strip edges of at least one portion of a metal strip running over a metal strip conveyor device of a rolling mill by a device as claimed in claim 1, the method comprising at a starting time, moving at least one sensing element into contact with a lateral edge of the metal strip, and gathering measuring data for determining the lateral strip contour by means of the sensing element while the at least one portion of the metal strip runs past the sensing element.

8. The method as claimed in claim 7, further comprising the measuring data relates to a spacing of the sensing element from a reference when contacting the lateral edge of the metal strip.

9. The method as claimed in claim 8, further comprising establishing contact at the starting time by a preselected starting contact force, and by contact between the lateral edge and the sensing element after the starting time is maintained at the starting contact force while the portion of the metal strip runs past the sensing element, and gathering measuring data from variations in the spacing from the reference necessary to this end.

10. The method as claimed in claim 7, further comprising the measuring data relates to a force exerted by the metal strip on the sensing element.

11. The method as claimed in claim 10, wherein after the starting time and while the portion of the metal strip runs past the sensing element, gathering measuring data of the force exerted by the metal strip on the sensing element, maintaining the position of the sensing element assumed at the starting time as long as the force exerted by the metal strip on the sensing element remains above 0 and below a limit value.

12. A method for correcting the running of a metal strip running over a metal strip conveyor device of a rolling mill, by a device as claimed in claim 1, based on the measuring data gathered according to a method for determining the lateral strip contour, and/or based on the determined lateral strip contour and/or the position of the strip edges, and the method comprising performing corrective measures on one or on a plurality of roll stands and/or on one or on a plurality of lateral guides of the rolling mill.

13. The method as claimed in claim 12, further comprising performing closed-loop controlling of the corrective measures on roll stands and/or on lateral guides based on the gathered measuring data and/or the determined lateral strip contour and/or the position of the strip edges.

14. A method for correcting the running of a metal strip running over a metal strip conveyor device of a rolling mill, by a device as claimed in claim 1, based on the measuring data gathered according to a method for determining the lateral strip contour, and/or based on the determined lateral strip contour and/or the position of the strip edges;

the method comprising: at a starting time, moving at least one sensing element into contact with a lateral edge of the metal strip, and gathering measuring data for determining the lateral strip contour by means of the sensing element while the at least one portion of the metal strip runs past the sensing element; and performing corrective measures on one or on a plurality of roll stands and/or on one or on a plurality of lateral guides of the rolling mill.

\* \* \* \* \*